US012473914B2

(12) United States Patent
Zhang et al.

(10) Patent No.: US 12,473,914 B2
(45) Date of Patent: Nov. 18, 2025

(54) SYSTEMS AND ASSEMBLIES FOR AN ELECTRIC MOTOR WITH INTEGRATED HYDRAULIC PUMP AND ELECTRONIC DRIVE DEVICE

(71) Applicant: Parker-Hannifin Corporation, Cleveland, OH (US)

(72) Inventors: Hao Zhang, Twinsburg, OH (US); Satish Kumar Raju Kalidindi, Mayfield Heights, OH (US); Steven R. Huard, Ulm, MN (US)

(73) Assignee: Parker-Hannifin Corporation, Cleveland, OH (US)

( * ) Notice: Subject to any disclaimer, the term of this patent is extended or adjusted under 35 U.S.C. 154(b) by 231 days.

(21) Appl. No.: 18/249,562

(22) PCT Filed: Sep. 23, 2021

(86) PCT No.: PCT/US2021/051632
§ 371 (c)(1),
(2) Date: Apr. 19, 2023

(87) PCT Pub. No.: WO2022/125165
PCT Pub. Date: Jun. 16, 2022

(65) Prior Publication Data
US 2023/0383748 A1  Nov. 30, 2023

Related U.S. Application Data

(60) Provisional application No. 63/172,154, filed on Apr. 8, 2021, provisional application No. 63/122,512, filed on Dec. 8, 2020.

(51) Int. Cl.
*F04C 11/00* (2006.01)
*F04C 15/00* (2006.01)

(52) U.S. Cl.
CPC ........ *F04C 11/008* (2013.01); *F04C 15/0096* (2013.01); *F04C 2240/30* (2013.01); *F04C 2240/808* (2013.01)

(58) Field of Classification Search
CPC ............... F04C 11/008; F04C 15/0096; F04C 2240/30; F04C 2240/808; F04C 2/10;
(Continued)

(56) References Cited

U.S. PATENT DOCUMENTS 1,347,732 A * 7/1920 Cooper ............... F04D 13/0646
415/58.4
2,734,459 A * 2/1956 Zimsky .................. H02K 5/128
417/357
(Continued)

FOREIGN PATENT DOCUMENTS

CN    102859254 A    1/2013
CN    103047134 A *  4/2013  ............. F04C 15/00
(Continued)

OTHER PUBLICATIONS

Notice of Reasons for Refusal prepared by the Japanese Patent Office in Application No. 2023-532511 dated Apr. 30, 2024. English translation included.
(Continued)

*Primary Examiner* — Mark A Laurenzi
*Assistant Examiner* — Benjamin Doyle
(74) *Attorney, Agent, or Firm* — McDonnell Boehnen Hulbert & Berghoff LLP

(57) ABSTRACT

An example assembly includes a main housing having an internal chamber therein; an electric motor disposed in the internal chamber of the main housing and comprising (i) a stator that is fixedly-positioned in the internal chamber of the main housing, and (ii) a motor rotor positioned within the stator and rotatable relative to the stator; a hydraulic
(Continued)

pump positioned in the main housing, at least partially within the motor rotor of the electric motor, wherein the hydraulic pump is configured to receive fluid from an inlet port and provide fluid flow to an outlet port, wherein the hydraulic pump comprises a pump drive shaft rotatably-coupled to the motor rotor of the electric motor; and a plurality of cooling fluid channels formed in the main housing and configured to allow fluid to circulate through the main housing to cool the main housing.

20 Claims, 11 Drawing Sheets

(58) Field of Classification Search
CPC ...... F04C 2/344; F04C 2240/40; F01C 21/10; F04B 49/06; F04B 53/08; F04B 53/16; F04B 23/02; F04B 17/03; F04B 35/04
USPC .......... 417/410.3, 366, 370, 357; 310/58, 54
See application file for complete search history.

(56) References Cited

U.S. PATENT DOCUMENTS

| | | | | |
|---|---|---|---|---|
| 2,844,101 | A * | 7/1958 | Burns | H02K 5/128 417/357 |
| 2,885,962 | A * | 5/1959 | Campbell | F04C 11/008 417/310 |
| 3,744,935 | A * | 7/1973 | Magni | F04D 29/5886 417/370 |
| 4,229,142 | A * | 10/1980 | Le Dall | F04D 1/10 417/350 |
| 4,854,373 | A * | 8/1989 | Williams | F24H 1/54 165/47 |
| 5,038,853 | A * | 8/1991 | Callaway, Sr. | H02K 5/203 165/47 |
| 5,137,299 | A * | 8/1992 | Jones | B60G 17/018 280/124.157 |
| 5,181,837 | A * | 1/1993 | Niemiec | F04B 17/03 417/372 |
| 5,810,568 | A * | 9/1998 | Whitefield | F04C 15/008 417/423.7 |
| 5,930,852 | A * | 8/1999 | Gravatt | F04D 13/06 4/493 |
| 5,997,261 | A * | 12/1999 | Kershaw | F04D 29/5813 417/357 |
| 6,200,108 | B1 * | 3/2001 | Caudill | F04D 29/5806 165/47 |
| 6,300,693 | B1 * | 10/2001 | Poag | H02K 5/203 310/58 |
| 6,329,731 | B1 * | 12/2001 | Arbanas | F16H 57/043 310/58 |
| 6,986,648 | B2 * | 1/2006 | Williams | F04D 13/064 417/370 |
| 7,347,674 | B2 * | 3/2008 | Terry | F04D 29/2222 417/423.1 |
| 7,737,584 | B2 * | 6/2010 | Muller | H02K 5/203 310/58 |
| 7,800,259 | B2 * | 9/2010 | Elgas | H02K 5/203 310/58 |
| 8,427,019 | B2 * | 4/2013 | Garriga | H02K 5/203 310/59 |
| 8,496,448 | B2 * | 7/2013 | Shieh | F04D 13/0606 417/370 |
| 8,608,458 | B2 * | 12/2013 | Jensen | F04D 29/5813 417/372 |
| 8,614,527 | B2 * | 12/2013 | Nagao | H02K 11/33 310/58 |
| 9,587,647 | B2 * | 3/2017 | Lee | F04D 13/0626 |
| 9,618,011 | B2 * | 4/2017 | Lee | F04D 29/5813 |
| 9,863,430 | B2 * | 1/2018 | Lee | H01M 8/04089 |
| 9,866,157 | B2 * | 1/2018 | Gopalakrishnan | H02P 6/16 |
| 10,119,556 | B2 * | 11/2018 | Peterson | E02F 9/2217 |
| 10,323,654 | B2 * | 6/2019 | Zhang | F04D 29/5813 |
| 10,337,513 | B2 * | 7/2019 | Reul | F04D 13/0653 |
| 11,011,955 | B2 * | 5/2021 | Kim | H02K 9/19 |
| 11,639,724 | B2 * | 5/2023 | Kim | F04D 29/28 415/175 |
| 11,965,505 | B2 * | 4/2024 | Crosio | F04C 2/08 |
| 2002/0087244 | A1 * | 7/2002 | Dix | F15B 11/163 701/50 |
| 2003/0077183 | A1 * | 4/2003 | Franchet | F15B 7/10 417/357 |
| 2004/0113500 | A1 * | 6/2004 | Casey | H02K 9/12 310/58 |
| 2007/0274848 | A1 * | 11/2007 | Arbogast | F04B 23/021 417/423.1 |
| 2010/0085005 | A1 * | 4/2010 | Palmer | H02K 21/145 318/722 |
| 2011/0000203 | A1 * | 1/2011 | Riedel | F15B 21/087 60/327 |
| 2011/0001370 | A1 | 1/2011 | Yamada et al. | |
| 2011/0179903 | A1 | 7/2011 | Tietyen et al. | |
| 2011/0208362 | A1 * | 8/2011 | Alstrin | F15B 21/08 700/282 |
| 2011/0209471 | A1 * | 9/2011 | Vanderlaan | F15B 7/006 60/446 |
| 2011/0268589 | A1 * | 11/2011 | Jensen | F04D 13/06 417/228 |
| 2012/0049669 | A1 * | 3/2012 | Garriga | H02K 9/12 310/59 |
| 2013/0004357 | A1 | 1/2013 | Sexton | |
| 2014/0354089 | A1 * | 12/2014 | Chamberlin | H02K 5/203 310/54 |
| 2015/0308463 | A1 * | 10/2015 | Gomm | F15B 11/003 60/459 |
| 2016/0102685 | A1 * | 4/2016 | Chester | F15B 11/003 60/434 |
| 2017/0167491 | A1 * | 6/2017 | Reul | F04B 17/03 |
| 2017/0328323 | A1 * | 11/2017 | Ashton | F04B 53/162 |
| 2018/0248442 | A1 * | 8/2018 | Fröhlich | H02K 5/20 |
| 2018/0287452 | A1 * | 10/2018 | Kim | H02K 5/203 |
| 2018/0362149 | A1 * | 12/2018 | Huynh | B64C 13/42 |
| 2019/0074751 | A1 * | 3/2019 | Chen | H02K 11/215 |
| 2019/0145433 | A1 * | 5/2019 | Thompson | F15B 11/17 60/422 |
| 2019/0199252 | A1 * | 6/2019 | Tsutsumi | G01D 5/2451 |
| 2019/0323473 | A1 | 10/2019 | Namuduri et al. | |
| 2020/0244203 | A1 * | 7/2020 | Hara | H02P 3/04 |
| 2021/0228916 | A1 | 7/2021 | Van Den Brink et al. | |
| 2021/0249981 | A1 * | 8/2021 | Ritchey | H02J 7/0014 |
| 2022/0275803 | A1 * | 9/2022 | Crosio | F04D 29/5813 |
| 2023/0020223 | A1 * | 1/2023 | Tucker | H02K 29/08 |
| 2023/0042503 | A1 * | 2/2023 | Bussières | H02K 37/14 |

FOREIGN PATENT DOCUMENTS

| | | | |
|---|---|---|---|
| CN | 103 527 475 A | 1/2014 | |
| CN | 109 458 328 A | 3/2019 | |
| CN | 110397535 A | 11/2019 | |
| CN | 111173658 A | 5/2020 | |
| CN | 112368053 A | 2/2021 | |
| DE | 10112500 | * 3/2001 | ............ B62D 5/064 |
| DE | 10112500 A1 | 9/2002 | |
| DE | 103 31 191 A1 | 1/2005 | |
| DE | 10201600535 A1 | 6/2017 | |
| EP | 3 244 063 A1 | 11/2017 | |
| EP | 3 549 242 A1 | 10/2019 | |
| JP | 2017-172509 | 9/2017 | |
| KR | 10-2020-0115260 | 10/2020 | |

OTHER PUBLICATIONS

Preliminary Rejection issued by the Korean Patent Office in application No. 10-2023-7018743 dated Oct. 30, 2024. English translation included.
International Search Report and Written Opinion prepared by the European Patent Office in International Application No. PCT/US2021/051632 dated Feb. 14, 2022.

(56) References Cited

OTHER PUBLICATIONS

First Office Action issued by the Chinese Patent Office in Application No. 2021800745402 dated Apr. 19, 2025. English translation included.
Communication Pursuant to Article 94(3) EPC issued by the European Patent Office in application No. 21 798 520.9 dated Jul. 1, 2025.

* cited by examiner

SYSTEMS AND ASSEMBLIES FOR AN ELECTRIC MOTOR WITH INTEGRATED HYDRAULIC PUMP AND ELECTRONIC DRIVE DEVICE

CROSS-REFERENCE TO RELATED APPLICATION

This application is a U.S. National Phase Application pursuant to 35 U.S.C § 371 of International Application No. PCT/US2021/051632 filed on Sep. 23, 2021, which claims priority to U.S. Provisional Application No. 63/122,512, filed Dec. 8, 2020, and U.S. Provisional Application No. 63/172,154, filed Apr. 8, 2021, the entire contents of all of which are incorporated herein by reference.

BACKGROUND

An electric motor can be used to drive a hydraulic pump. For example, an output shaft coupled to a rotor of the electric motor can be coupled to a shaft of the hydraulic pump, such that rotation of the rotor can cause a rotating group of the hydraulic pump to rotate and provide fluid flow.

An electronic drive device including an inverter and motor controller is typically separate from the motor and is connected to wire windings of a stator of the electric motor via cables. It may be desirable to have an assembly that integrates the hydraulic pump and the electronic drive device with the electric motor. This way, mechanical components, such as shafts, bearing, etc., can be shared between hydraulic pump and the motor. It may also be desirable to properly support components of the electric motor and the hydraulic pump and maintain them lubricated to elongate the life of the assembly.

Typically, a hydraulic system may have a system controller that controls the actuator in addition to the controller of the electric motor and hydraulic pump. Thus, multiple controllers may be in communication with each other with cables and signals connecting them. It may thus be desirable to configure the electronic drive device of the assembly to receive actuator sensor information associated with an actuator driven by the hydraulic pump, and the electronic drive device can then control the electric motor and hydraulic pump to achieve commanded motion of the actuator. This way, the system controller can be integrated with the electric motor controller into a single controller and avoid having cables, buses, or signals between separate controllers.

Further cavitation may occur at the inlet of a pump due to vaporization of liquid as a result of pressure and fluid velocity changes. Cavitation could cause wear of the pump components, which affects performance of the pump. It may thus be desirable to configure the assembly with features that may preclude cavitation.

During operation, heat is generated and may cause damage to components of the assembly. It may be desirable to cool components of the electric motor. It may further be desirable to integrate a cooling circuit in the assembly that uses the pump fluid to cool the electric motor rather than having a separate cooling fluid circuit.

It is with respect to these and other considerations that the disclosure made herein is presented.

SUMMARY

The present disclosure describes implementations that relate to systems and assemblies for an electric motor with integrated hydraulic pump and electronic drive device.

In a first example implementation, the present disclosure describes an assembly comprising: a main housing having an internal chamber therein; an electric motor disposed in the internal chamber of the main housing and comprising (i) a stator that is fixedly-positioned in the internal chamber of the main housing, and (ii) a motor rotor positioned within the stator and rotatable relative to the stator; a hydraulic pump positioned in the main housing, at least partially within the motor rotor of the electric motor, wherein the hydraulic pump is configured to receive fluid from an inlet port and provide fluid flow to an outlet port, wherein the hydraulic pump comprises a pump drive shaft rotatably-coupled to the motor rotor of the electric motor; and a plurality of cooling fluid channels formed in the main housing and configured to allow fluid to circulate through the main housing to cool the main housing.

In a second example implementation, the present disclosure describes a system comprising: an actuator having a first chamber and a second chamber; and a valve assembly configured to control fluid flow to and from the first chamber and the second chamber of the actuator; and the assembly of the first example implementation wherein the outlet port is fluidly-coupled to the valve assembly, such that the hydraulic pump is configured to provide fluid flow to the actuator via the valve assembly.

The foregoing summary is illustrative only and is not intended to be in any way limiting. In addition to the illustrative aspects, implementations, and features described above, further aspects, implementations, and features will become apparent by reference to the figures and the following detailed description.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying Figures.

DETAILED DESCRIPTION

The present disclosure relates to integrating or embedding a hydraulic pump and an electronic drive device (including a motor and actuator controller as well as an inverter) with an electric motor to have an assembly providing a compact configuration that reduces cost by sharing components, saves space, and enhances reliability.

The inlet to the pump is configured to enhance the fluid feeding capacity and reduce the likelihood of occurrence of cavitation. The rotor of the electric motor is properly supported at two points, on its exterior surface and interior surface, to provide enhanced support while allowing components of the hydraulic pump to be disposed, at least partially, within the rotor. The drive shaft of the hydraulic pump is drivingly connected to the rotor of the electric motor via a spline connection, and the spline connection is maintained lubricated and sealed to enhanced life and performance of the assembly.

Further, the main housing of the assembly electric motor is configured to have a cooling circuit comprising channels or paths that zig zag through the main housing and configured to circulate a portion of the pump fluid to cool the main housing.

A sensor is mounted to one board of the electronic drive device to provide sensor information indicative of speed of the drive shaft of the hydraulic pump and the rotor of the electric motor. The sensor has a magnet and a sensor chip configured to measure changes in magnetic field as the shaft rotates to measure the speed of the shaft. The magnetic orientation of the magnet of the sensor is aligned with orientation of the magnets of the electric motor rotor to enhance performance and accuracy of the sensor.

Figure 1:
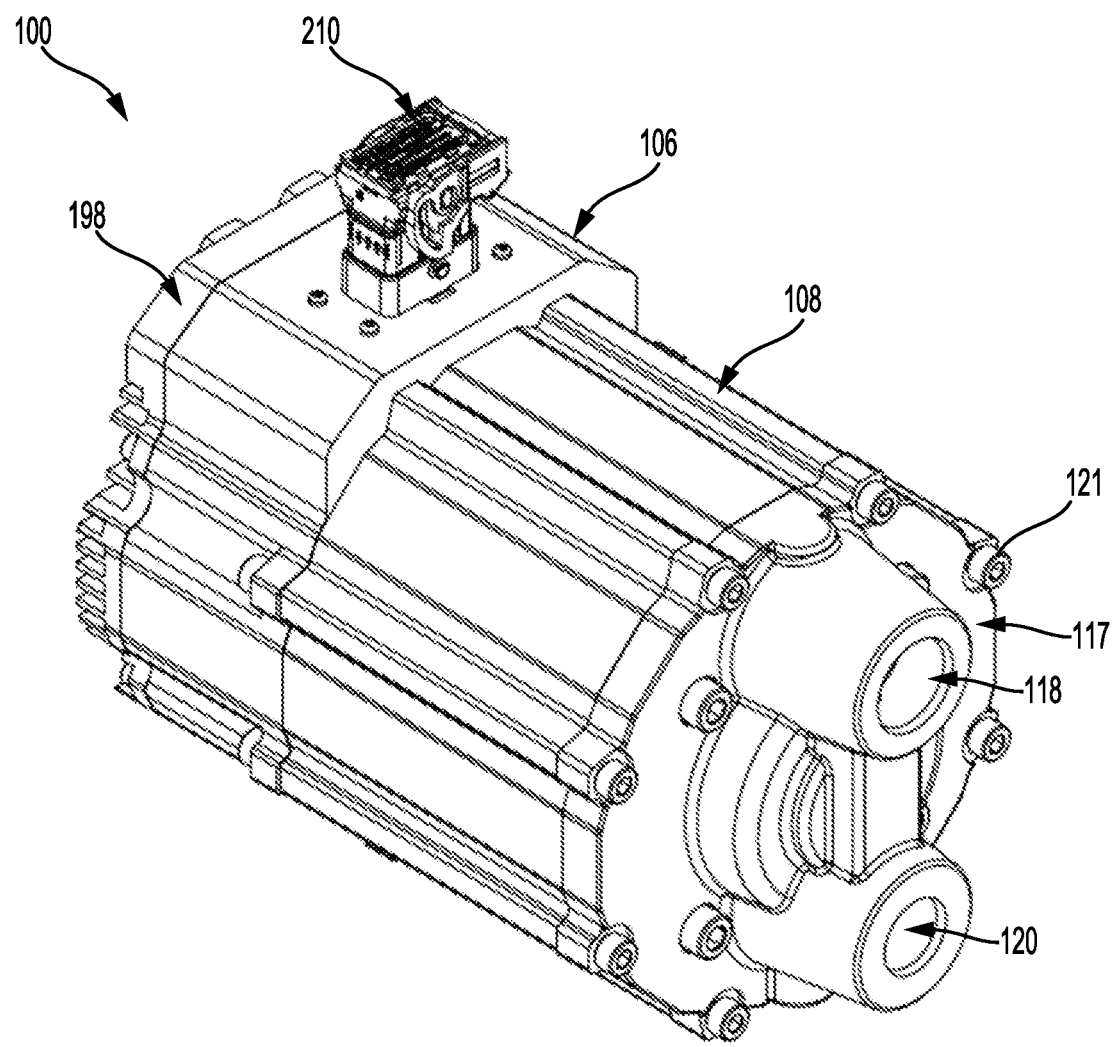
FIG. 1 illustrates a perspective view of an assembly, in accordance with an example implementation.
Figure 2:
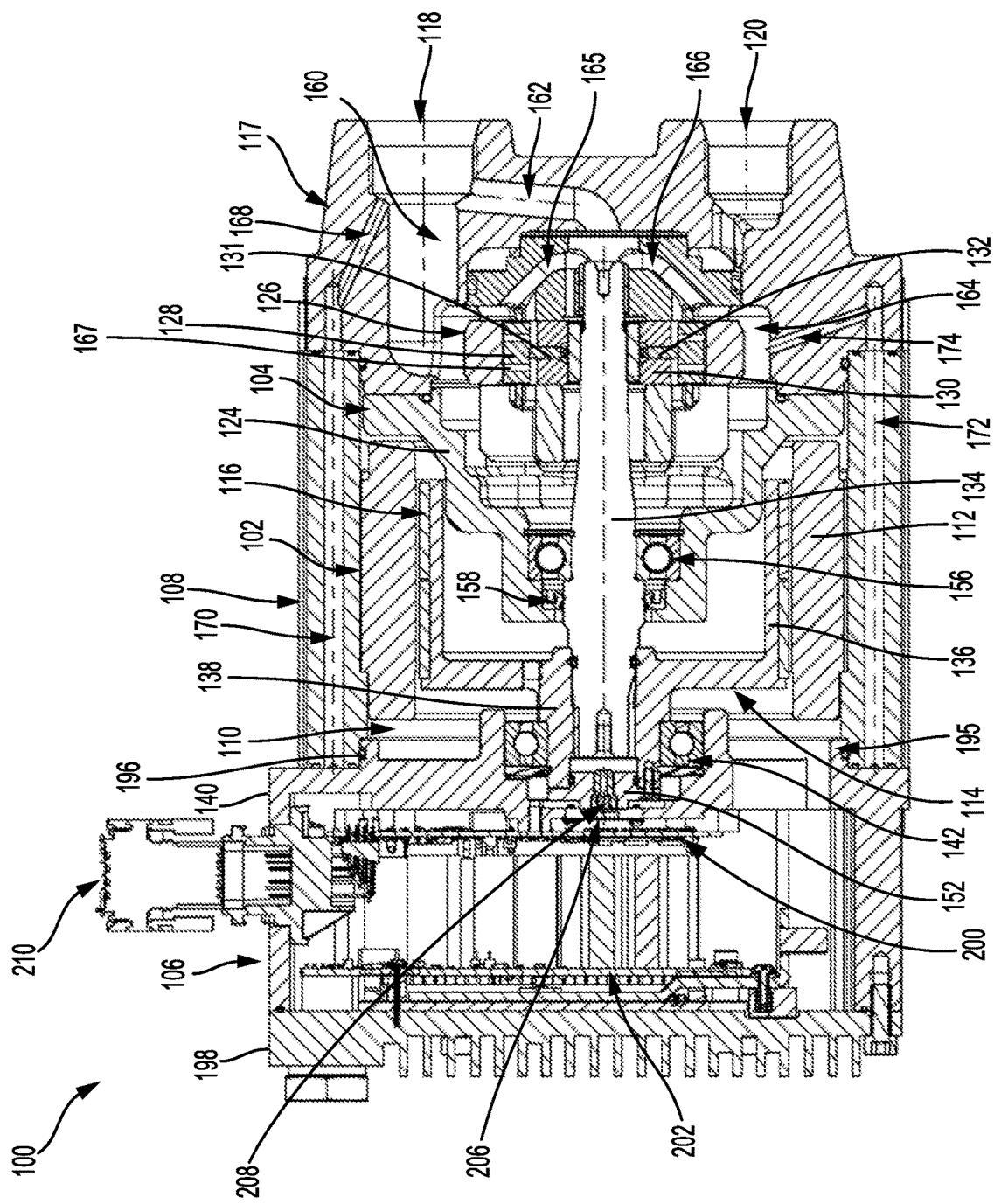
FIG. 2 illustrates a cross-sectional side view of the assembly of FIG. 1, in accordance with an example implementation.
Figure 3:
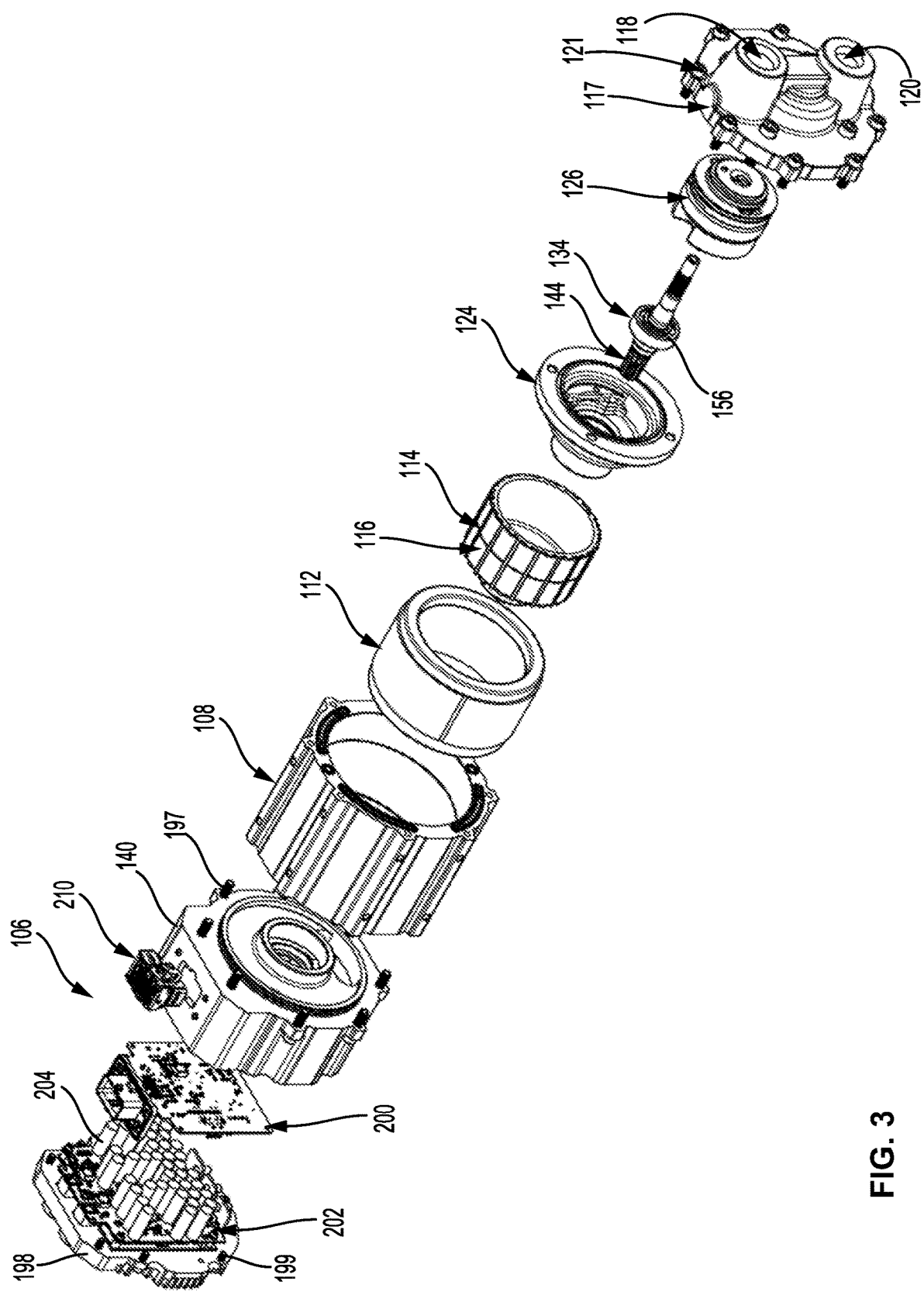
FIG. 3 illustrates a perspective exploded view of the assembly of FIG. 1, in accordance with another example implementation.

FIG. 1 illustrates a perspective view of an assembly 100, FIG. 2 illustrates a cross-sectional side view of the assembly 100, and FIG. 3 illustrates a perspective exploded view of the assembly 100, in accordance with an example implementation. FIGS. 1-3 are described together.

The assembly 100 comprises an electric motor 102, a hydraulic pump 104, and an electronic drive device 106 integrated together. The assembly 100 includes a main housing 108 having an internal chamber 110 therein in which components of the electric motor 102 and the hydraulic pump 104 are disposed.

The electric motor 102 includes a stator 112 fixedly-positioned within the internal chamber 110 of the main housing 108. The stator 112 is configured to generate a magnetic field. Particularly, the stator 112 can include wire windings (not shown) wrapped about a body (e.g., a lamination stack) of the stator 112, and when electric current is provided through the wire windings, a magnetic field is generated.

The electric motor 102 further includes a motor rotor 114 positioned within the stator 112. The electric motor 102 can further include magnets 116 mounted to the motor rotor 114 in an annular space between the stator 112 and the motor rotor 114. In an example, the magnets 116 include two circumferential arrays of magnets axially-spaced and disposed about the motor rotor 114 as shown in FIG. 3.

The magnets 116 are configured to interact with the magnetic field generated by the stator 112 in order to rotate the motor rotor 114 and produce torque. In other example implementation, a different type of electric motor might be used that does not include permanent magnets.

The hydraulic pump 104 is mounted within the main housing 108 and, at least partially, within the motor rotor 114 and the stator 112 of the electric motor 102. The assembly 100 has a pump port block 117 having an inlet port 118 and an outlet port 120. The pump port block 117 is coupled to the main housing 108 via a plurality of fasteners or bolts such as bolt 121.

The hydraulic pump 104 can be configured, for example, as a vane pump. Particularly, the hydraulic pump 104 has a pump cover 124 and a vane cartridge 126. The vane cartridge 126 has a pump housing 128, a pump rotor 130, vanes such as vane 131 and vane 132, and a pump drive shaft 134.

The motor rotor 114 has a cylindrical portion 136 and a spindle portion 138. The spindle portion 138 is supported within an electronic device housing 140 of the electronic drive device 106 via a bearing 142 disposed about an exterior surface of the spindle portion 138 of the motor rotor 114 to allow the motor rotor 114 to rotate relative to the main housing 108 and the electronic device housing 140. Further, the pump drive shaft 134 provides additional support for the motor rotor 114.

Figure 4A:
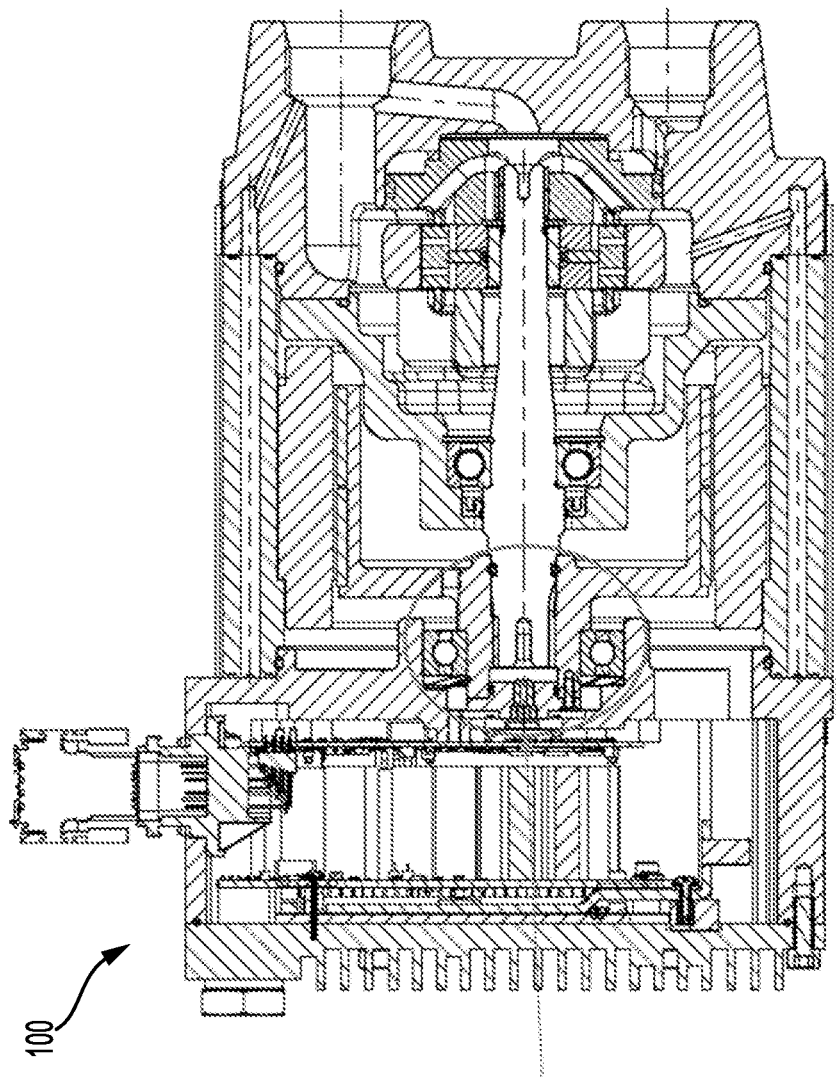
FIG. 4A illustrates the cross-sectional view of FIG. 2, in accordance with an example implementation.
Figure 4B:
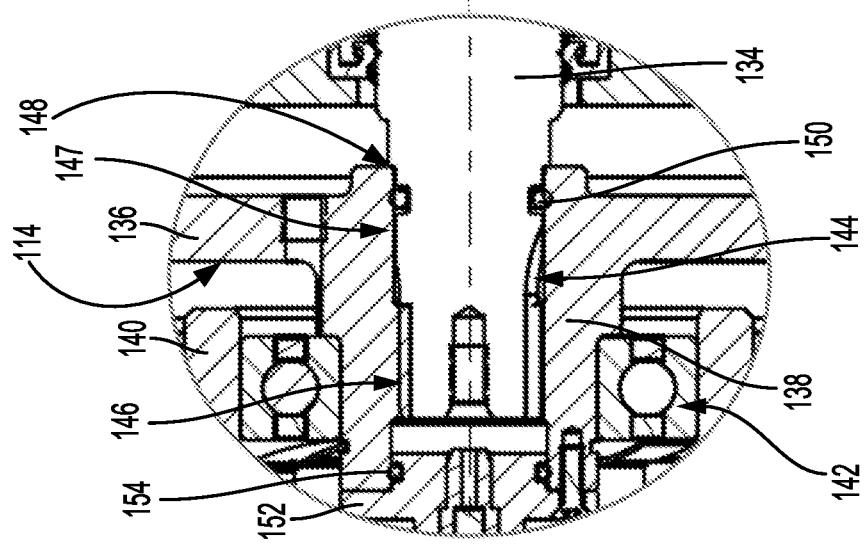
FIG. 4B illustrates a detailed sectional view showing a pump drive shaft supporting a motor rotor, in accordance with an example implementation.

FIG. 4A illustrates the cross-sectional view of FIG. 2, and FIG. 4B illustrates a detailed sectional view showing the pump drive shaft 134 supporting the motor rotor 114, in accordance with an example implementation. Particularly, FIG. 4B is a zoomed-in view of the cross-sectional view of FIG. 4A illustrating the interface between the pump drive shaft 134 and the spindle portion 138 of the motor rotor 114.

The pump drive shaft 134 is rotatably-coupled to the motor rotor 114. Referring to FIGS. 3 and 4B together, the pump drive shaft 134 has splines 144 formed about the exterior surface of the pump drive shaft 134 and configured to engage with respective splines 146 formed on an interior surface of the spindle portion 138 of the motor rotor 114. This way, the motor rotor 114 is drivingly connected to the pump drive shaft 134 and is configured to transmit rotary motion to the pump drive shaft 134 during operation of the assembly 100.

As mentioned above, the motor rotor 114, and particularly the spindle portion 138 thereof, is supported about its exterior surface via the bearing 142. Additionally, the pump drive shaft 134 has an increased diameter portion 147 and shoulder 148 that provide support for the interior surface of the spindle portion 138 of the motor rotor 114 as shown in FIG. 4B. As such, the motor rotor 114 is supported at two areas or points: an area about its exterior surfaces supported by the bearing 142 and an area about its interior surface where the motor rotor 114 is supported by the pump drive shaft 134. With this configuration, the pump drive shaft 134 provides an extended support for the motor rotor 114 and may preclude misalignments or twisting of the motor rotor 114 during operation.

During operation, as the motor rotor 114 rotates, the spline engagement with the pump drive shaft 134 causes the rotary motion of the motor rotor 114 to be transmitted to the pump drive shaft 134. It may be desirable to maintain the spline engagement between the splines 146 and the splines 144 lubricated. Such lubrication elongates the life of the components (e.g., the motor rotor 114 and the pump drive shaft 134) of the assembly 100. For example, grease may be used to lubricate the spline engagement between the splines 146 and the splines 144.

It may be desirable to maintain the grease or any lubrication fluid at the area of spline engagement. As such, the assembly 100 includes a first seal 150 (e.g., an O-ring) disposed in a groove formed about an exterior surface of the pump drive shaft 134. Further, the assembly 100 includes a cap 152 inserted within the spindle portion 138 of the motor rotor 114, and the cap 152 has a second seal 154 (e.g., an O-ring) disposed in a groove formed about a respective exterior surface of the cap 152.

The first seal 150 and the second seal 154 straddle the splines 144, 146. This way, any lubricant at the area of spline engagement between the splines 146 and the splines 144 is sealed and remains between the first seal 150 and the second seal 154. With this configuration, the lubricant might not leak outside the area of spline engagement.

Referring back to FIGS. 2-3, the assembly 100 further includes another bearing 156 disposed about the exterior surface of, and provides support to, the pump drive shaft 134. Particularly, the bearing 156 is disposed between the exterior surface of the pump drive shaft 134 and the interior surface of the pump cover 124 and allows the pump drive shaft 134 to rotate relative to the pump cover 124. The assembly further includes a shaft seal 158 also disposed between the exterior surface of the pump drive shaft 134 and the interior surface of the pump cover 124 and configured to preclude leakage of fluid from the hydraulic pump 104 into the electric motor 102.

Figure 5:
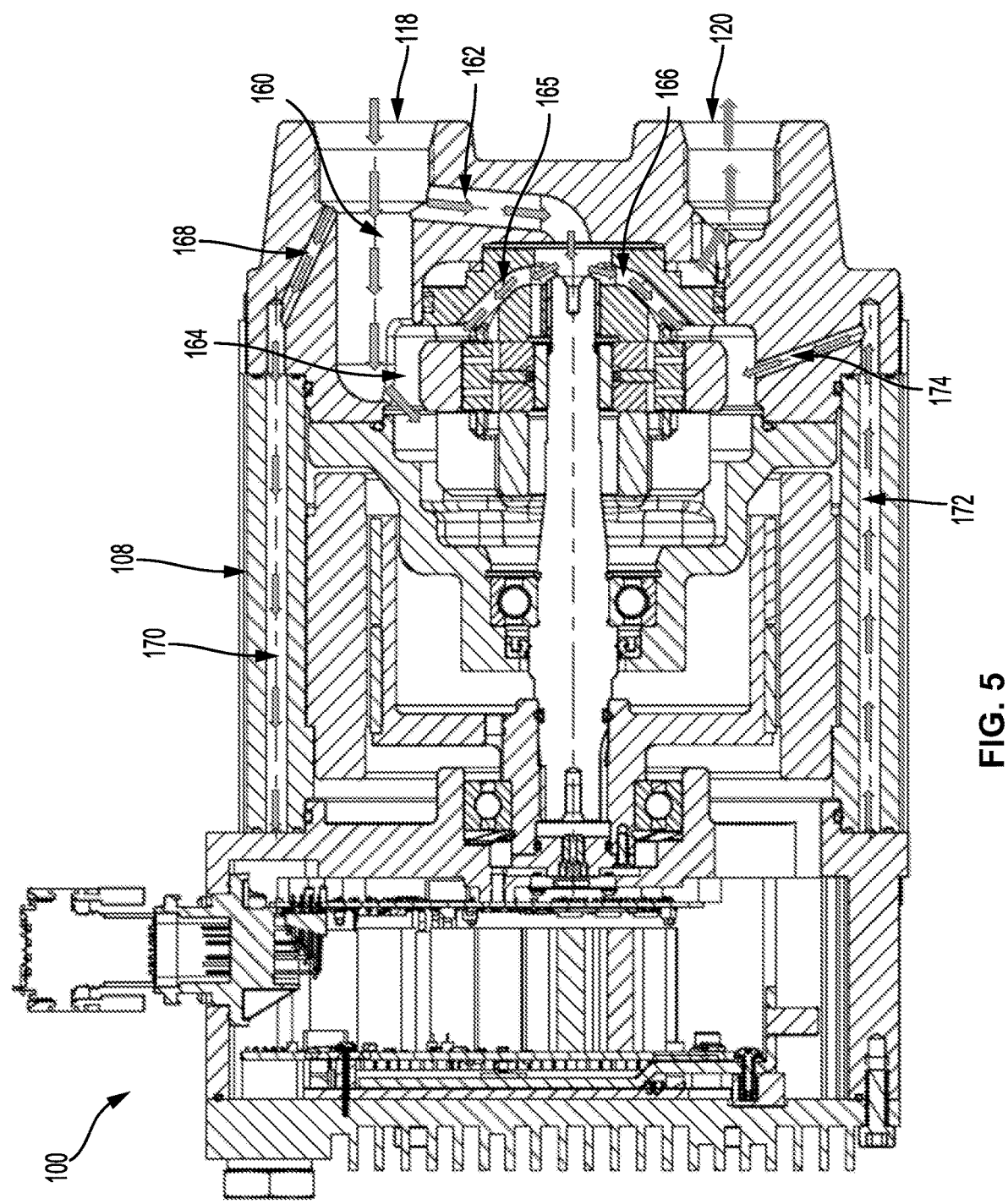
FIG. 5 illustrates the cross-sectional view of FIG. 2 showing fluid paths within the assembly during operation, in accordance with an example implementation.

FIG. 5 illustrates the cross-sectional view of FIG. 2 showing fluid paths within the assembly 100 during operation, in accordance with an example implementation. Referring to FIGS. 2 and 5 together, fluid received at the inlet port 118 flows through a first feeding passage 160 and a second feeding passage 162. Fluid flows from the first feeding passage 160 to a pump chamber 164. Fluid also flows from the second feeding passage 162, through arcuate fluid passage 165 and arcuate fluid passage 166 formed in the vane cartridge 126 to join fluid from the first feeding passage at the pump chamber 164.

Having two feeding passages, rather than one, may advantageously increase the feeding capacity to the hydraulic pump 104. As more fluid is being fed to the hydraulic pump 104, the likelihood of occurrence of cavitation is decreased or eliminated.

The pump rotor 130 is configured to be eccentrically supported within the pump housing 128, which has a cycloidal interior surface. The pump rotor 130 is located close to the interior surface wall of the pump housing 128 such that a crescent-shaped cavity is formed therebetween. The vanes, such as the vanes 131, 132 fit within slots in the pump rotor 130.

As the pump drive shaft 134 rotates (when the motor rotor 114 rotates), the pump rotor 130 also rotates. As the pump rotor 130 rotates, centrifugal force, hydraulic pressure, pushrods, and/or springs push the vanes 131, 132 radially-outward toward the interior surface of the pump housing 128. Fluid is then forced or sucked from the pump chamber 164 into the pump housing 128 via holes such as hole 167 shown in FIG. 2. Particularly, fluid enters pockets created by the vanes 131, 132, the pump rotor 130, and the pump housing 128.

As the pump rotor 130 continues rotating, the vanes 131, 132 sweep the fluid to the opposite side of the crescent-shaped cavity where it is squeezed through discharge holes in the pump housing 128. Fluid is then forced to the outlet port 120 from which where fluid exits the assembly 100. Fluid is then provided to an actuator fluidly-coupled to the assembly 100 as described below with respect to FIGS. 7-8.

A vane pump is used herein as an example for illustration. It should be understood that other types of pumps such as a gear pump or a piston pump may be used as well.

In addition to fluid received at the inlet port 118 being provided to the hydraulic pump 104, it is also used as cooling fluid for the main housing 108. Particularly, referring to FIGS. 2 and 5, the pump port block 117 has an inlet cooling fluid passage 168 branching from or fluidly-coupled to the inlet port 118 and aligned with a supply cooling fluid channel 170 in the main housing 108. Cooling fluid then circulates through the main housing 108 and returns through a return cooling fluid channel 172 in the main housing 108, then flows through outlet cooling fluid passage 174, then joins fluid from the inlet port 118 entering the pump chamber 164.

Figure 6A:
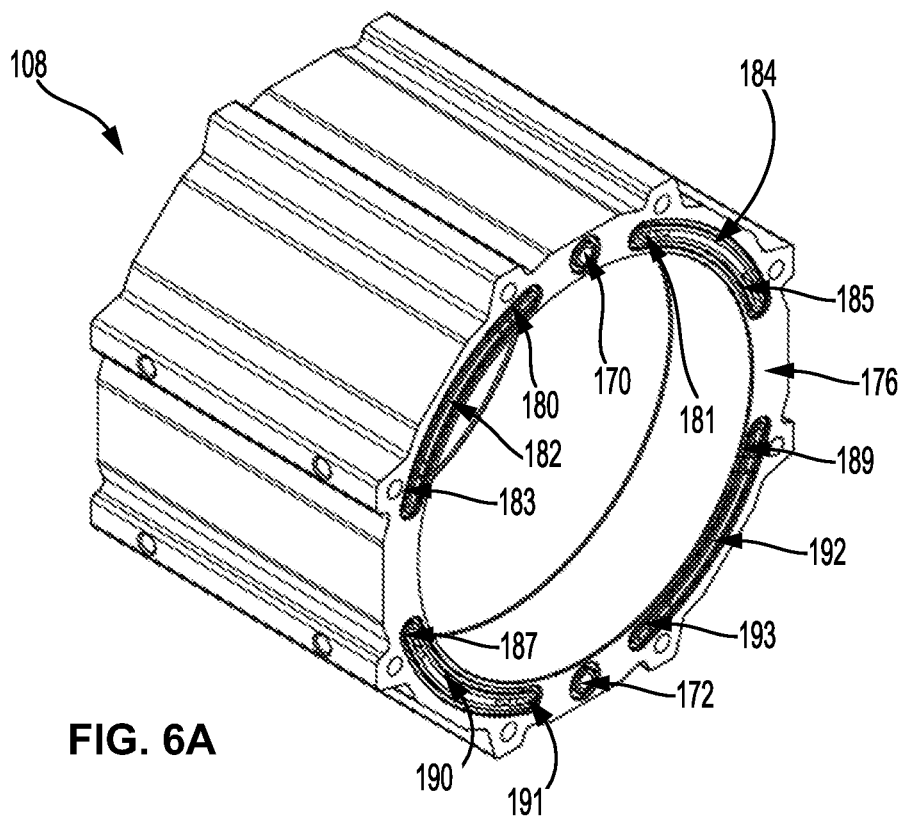
FIG. 6A illustrates a perspective view of a main housing of the assembly of FIG. 1 showing a front side of the main housing, in accordance with an example implementation.
Figure 6B:
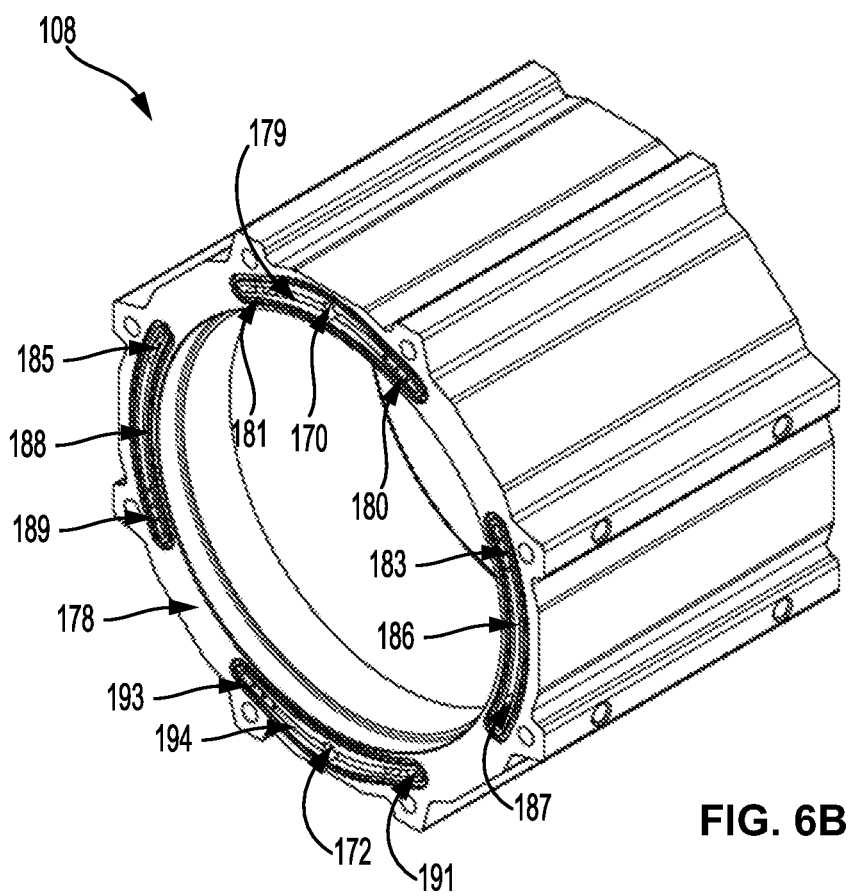
FIG. 6B illustrates a perspective view of the main housing showing a rear side of the main housing, in accordance with an example implementation.
Figure 6C:
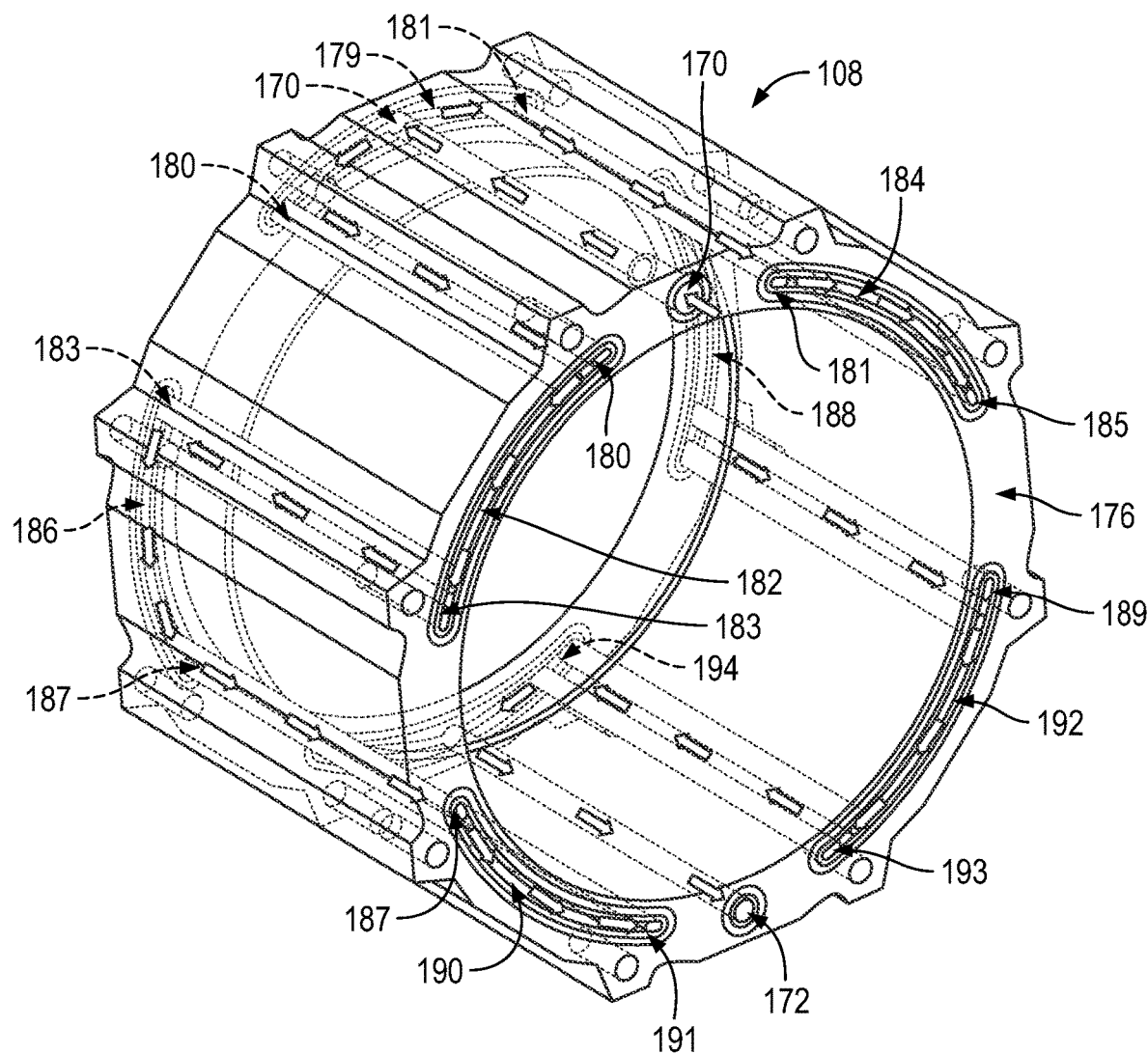
FIG. 6C illustrates a perspective transparent view of the main housing showing cooling fluid circulation through the main housing, in accordance with an example implementation.

FIG. 6A illustrates a perspective view of the main housing 108 showing a front side of the main housing 108, FIG. 6B illustrates a perspective view of the main housing 108 showing a rear side of the main housing 108, and FIG. 6C illustrates a perspective transparent view of the main housing 108 showing cooling fluid circulation through the main housing 108, in accordance with an example implementation. Cooling fluid circulation is described with reference to FIGS. 6A-6C together. As depicted, the main housing 108 has a plurality of cooling fluid channels and arcuate grooves formed in a front end face 176 and a back end face 178 of the main housing 108, and the arcuate grooves fluidly couple cooling fluid channels of the plurality of cooling fluid channels to facilitate circulating the cooling fluid.

As described above, a portion of the fluid from the inlet port 118 is provided to the supply cooling fluid channel 170, the inlet of which is shown in FIG. 6A on the front end face 176 of the main housing 108. Cooling fluid traverses the supply cooling fluid channel 170 as shown in FIG. 6C to the back end face 178 shown in FIG. 6B. The back end face 178 has an arcuate groove 179 that receives fluid exiting from the supply cooling fluid channel 170 and directs the fluid along the back end face 178 to cooling fluid channels 180 and cooling fluid channels 181 formed in the main housing 108. Cooling fluid traverses the cooling fluid channels 180, 181 back to the front end face 176.

The front end face 176 has an arcuate groove 182 that receives fluid exiting from the cooling fluid channel 180 and directs the fluid along the front end face 176 to cooling fluid channels 183. Similarly, the front end face 176 has an arcuate groove 184 that receives fluid exiting from the cooling fluid channel 181 and directs the fluid along the front end face 176 to cooling fluid channels 185. Cooling fluid then traverses the cooling fluid channels 183, 185 back to the back end face 178.

The back end face 178 has an arcuate groove 186 that receives fluid exiting from the cooling fluid channel 183 and directs the fluid along the back end face 178 to cooling fluid channels 187. Similarly, the back end face 178 has an arcuate groove 188 that receives fluid exiting from the cooling fluid channel 185 and directs the fluid along the back end face 178 to cooling fluid channels 189. Cooling fluid then traverses the cooling fluid channels 187, 189 back to the front end face 176.

The front end face 176 has an arcuate groove 190 that receives fluid exiting from the cooling fluid channel 187 and directs the fluid along the front end face 176 to cooling fluid channels 191. Similarly, the front end face 176 has an arcuate groove 192 that receives fluid exiting from the cooling fluid channel 189 and directs the fluid along the front end face 176 to cooling fluid channels 193. Cooling fluid then traverses the cooling fluid channels 191, 193 back to the back end face 178.

The back end face 178 has an arcuate groove 194 that receives fluid exiting from the cooling fluid channels 191, 193 and directs the fluid along the back end face 178 to the return cooling fluid channel 172. As mentioned above, cooling fluid returning through the return cooling fluid channel 172 flows through the outlet cooling fluid passage 174 in the pump port block 117 (see FIG. 2), then joins fluid from the inlet port 118 into the pump chamber 164.

As such, fluid zigzags or circulates back and forth between the front end face 176 and the back end face 178 of the main housing 108 as depicted in FIG. 6C. As shown in FIG. 2, the main housing 108 is mounted to the electronic device housing 140, wherein the electronic device housing 140 has a cylindrical protrusion 195, the exterior surface of which interfaces with an interior surface of the main housing 108. A seal 196 disposed in an annular groove formed in the exterior surface of the cylindrical protrusion 195 seals the cooling fluid and precludes it from entering the internal chamber 110 in which the electric motor 102 is disposed.

Referring back to FIG. 3, the electronic device housing 140 is coupled to the main housing via bolts such as bolt 197. The electronic device housing 140 is further coupled to an electronics housing cover 198 via a plurality of bolts, such as bolt 199. With this configuration, the electronic device housing 140 and the electronics housing cover 198 form an enclosure in which electronic boars and components of the electronic drive device 106 are disposed. This way, the electronic drive device 106 is integrated with the electric motor 102 and the hydraulic pump 104 in the assembly 100.

The electronic drive device 106 can include one or more electronic boards such as a controller board 200 and an inverter board 202 that are electrically-coupled and axially offset from each other as depicted. The controller board 200 and the inverter board 202 can be configured as printed circuit boards (PCBs). A PCB mechanically supports and electrically connects electronic components (e.g., microprocessors, integrated chips, capacitors, resistors, etc.) using conductive tracks, pads, and other features etched from one or more sheet layers of copper laminate onto and/or between sheet layers of a nonconductive substrate. Components are generally soldered onto the PCB to both electrically connect and mechanically fasten them to it.

The inverter board 202 can be separated from, and coupled to, the controller board 200 via stand-offs such as stand-off 204. The inverter board 202 can include a plurality of bus bars that are electrically-conductive and are configured to receive direct current (DC) power and provide the power to components mounted to the inverter board 202.

As an example, the DC power can be provided to the inverter board 202 from a battery. With this configuration, DC power is provided to the bus bars, which then transmit the power to other components of the inverter board 202.

The inverter board 202 can be configured as a power converter that converts DC power received at the inverter board 202 to three-phase, alternating current (AC) power that can be provided to wire windings of the stator 112 to drive the electric motor 102. For example, the inverter board 202 can include a semiconductor switching matrix mounted to the inverter board 202 and configured to be electrically-connected to a positive DC terminal and to a negative DC terminal. The inverter board 202 can further include a plurality of capacitors disposed in the axial space between the inverter board 202 and the controller board 200.

The semiconductor switching matrix can include any arrangement of semiconductor switching devices that supports DC to three-phase power conversion. For example, the semiconductor switching matrix can include a three-phase, with bridge elements electrically-coupled to input DC terminals and connected to three-phase AC output terminals.

In an example, the semiconductor switching matrix includes a plurality of transistors (e.g., an Insulated Gate Bipolar Transistor or a metal-oxide-semiconductor field-effect transistor). The transistors are switchable between an activated or "on" state and a deactivated or "off" state, e.g., via a pulse width modulated (PWM) signal provided by a microprocessor mounted to the controller board 200. A microprocessor can comprise one or more processors. A processor can include a general purpose processor (e.g., an INTEL® single core microprocessor or an INTEL® multi-core microprocessor), or a special purpose processor (e.g., a digital signal processor, a graphics processor, or an application specific integrated circuit (ASIC) processor). A processor can be configured to execute computer-readable program instructions (CRPI) to perform the operations described throughout herein. A processor can be configured to execute hard-coded functionality in addition to or as an alternative to software-coded functionality (e.g., via CRPI).

As the transistors of the semiconductor switching matrix are activated and deactivated at particular times via the PWM signal, AC voltage waveforms are generated at the AC output terminals. As such, the voltage waveforms at the AC output terminals are pulse width modulated and swing between voltage potential DC+ and voltage potential DC−. The AC voltage waveforms are then provided to the wire windings of the stator 112 to drive the electric motor 102. The controller board 200 and the inverter board 202 can include several junctions to facilitate receiving and transmitting signals and power therebetween and to other components of the assembly 100 or external components.

The electronic drive device 106 can include a plurality of sensors. For example, the electronic drive device 106 can include temperature sensors configured to provide information indicative of an operating temperature of the electric motor 102 and/or the fluid temperature of hydraulic fluid flowing through the hydraulic pump 104. The electronic drive device 106 can also include Hall-Effect current sensors that provide information indicative of electric current level in windings of the stator 112.

The electronic drive device 106 can further include a pressure sensor indicative of pressure level of fluid within the assembly 100. The electronic drive device 106 can also include a rotary position sensor configured to provide sensor information indicative of angular position of the motor rotor 114 and the pump drive shaft 134. The rotary position sensor information can be used by the microprocessor controlling the electric motor 102 so as to control speed and torque produced by the motor rotor 114 in a closed-loop feedback control configuration.

For example, the controller board 200 can include a sensor chip or encoder 206 to be mounted near the spindle portion 138 of the motor rotor 114 as show in FIG. 2. The encoder 206 can be configured to interact with a magnet 208 disposed in the cap 152. The encoder 206 is configured as an electro-mechanical device that converts the angular position or motion of the motor rotor 114 to analog or digital output signals that are provided to the microprocessor controlling the electric motor 102. In an example implementation, to enhance accuracy of the sensor information provided by the encoder 206, the magnetic polarity of the magnet 208 is aligned with, or have the same orientation as, respective magnetic polarity of respective magnets (i.e., the magnets 116) of the electric motor 102.

Figure 7:
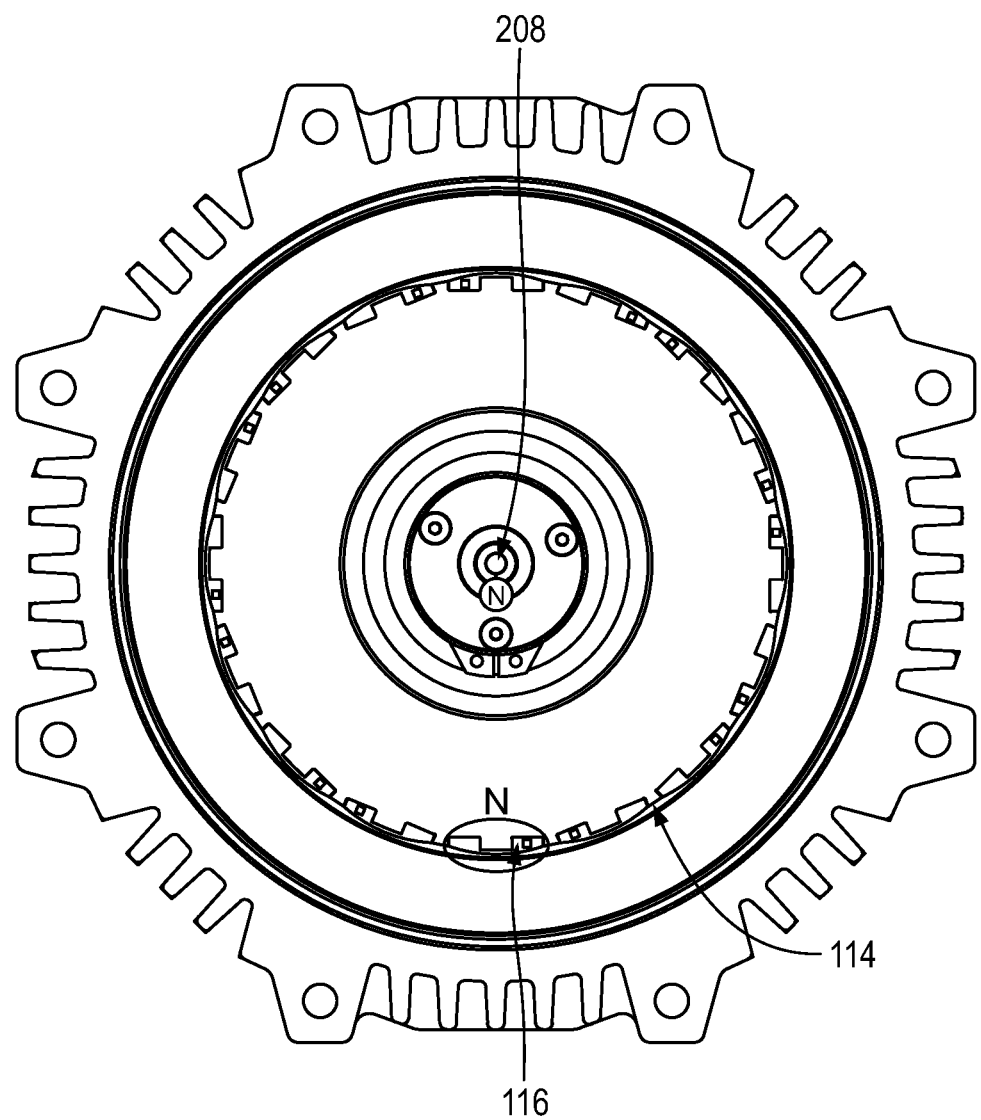
FIG. 7 illustrates a partial cross-sectional front view of the assembly of FIG. 1 showing magnetic orientation of a magnet of a rotary position sensor and magnets of a motor rotor, in accordance with an example implementation

FIG. 7 illustrates a partial cross-sectional front view of the assembly 100 showing magnetic orientation of the magnet 208 of the encoder 206 and the magnets 116 of the motor rotor 114, in accordance with an example implementation. As shown, the North "N" of the magnet 208 and the North "N" of the magnets 116 of the motor rotor 114 are in the same direction or orientation.

As shown in FIGS. 1-3, the electronic drive device 106 can further include an electric connector 210 configured as a hollow plastic component housing a plurality of conductor pins that are electrically-connected to the conductive tracks of the controller board 200. A connector socket (not shown) having female pins can be mounted to or inserted into the electric connector 210 such that the conductor pins contact the female pins of the connector socket. Wires can be connected to the female pins so as to provide signals to, and receive signals from, the conductor pins of the electric connector 210.

With this configuration, the electronic drive device 106 can receive via the electric connector 210 various inputs and sensor signals and provide commands in response to the received information. For example, the electronic drive device 106 can receive a command signal from a central controller or from an input device of a machine (e.g., a joystick of a hydraulic machine such as a wheel loader, backhoe, or excavator) indicative of a desired fluid pressure and fluid flow rate to be provided by the hydraulic pump 104. The electronic drive device 106 can then control the AC power provided to the stator 112 to generate a particular speed and torque at the pump drive shaft 134 to provide the desired fluid pressure level and flow rate. The electronic drive device 106 can also provide sensor signals (e.g., from the encoder 206) to another central controller via the electric connector 210.

As such, the electronic drive device 106 can be used as a controller for the assembly 100 as well as the actuator controlled by the assembly 100. Particularly, the electronic drive device 106 receives command inputs and sensor signals from sensors internal to the assembly 100 and sensors associated with the actuator, and responsively controls the electric motor 102 and the hydraulic pump 104 to achieve desired or commanded motion of the actuator.

Figure 8:
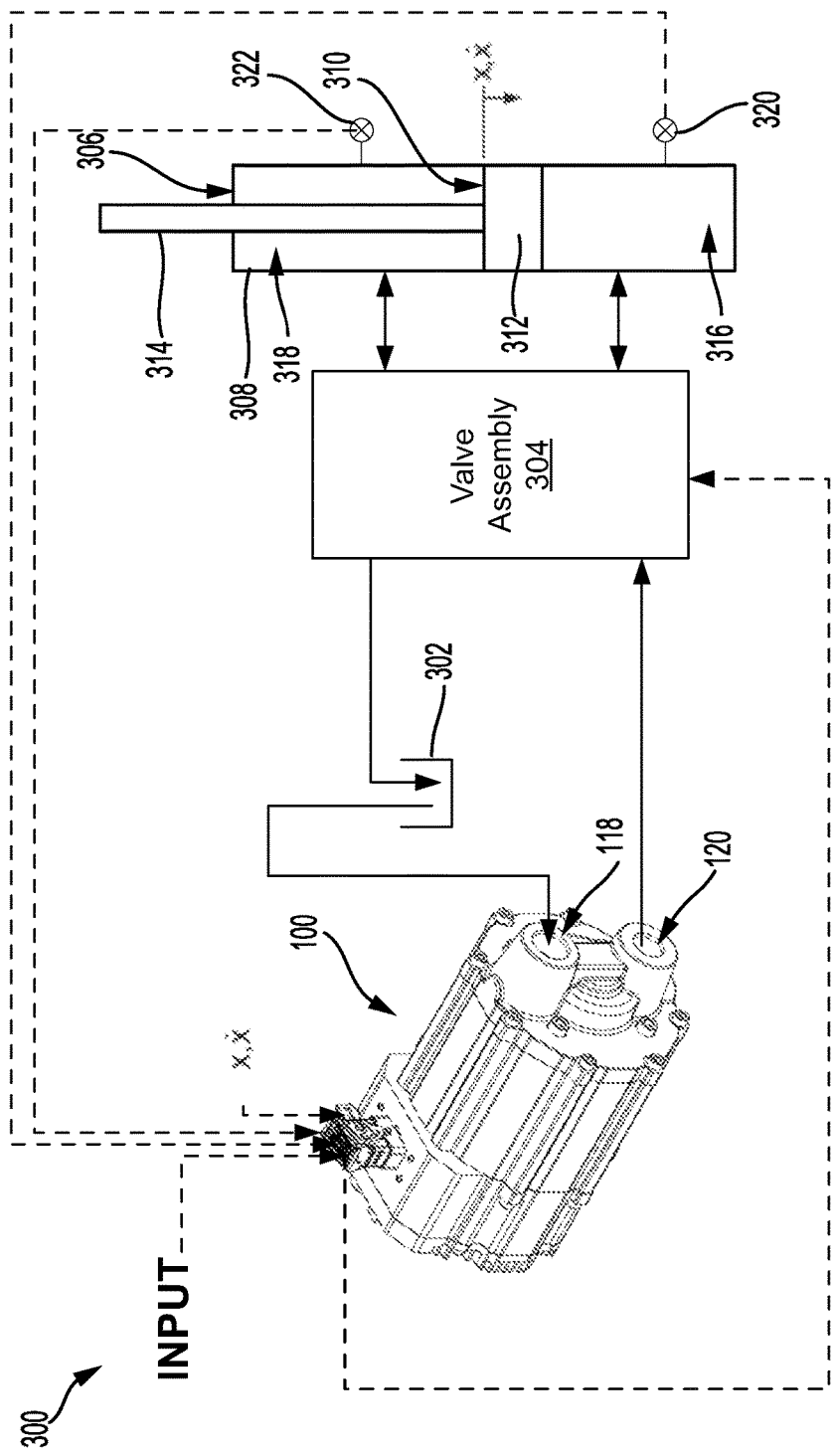
FIG. 8 illustrates a hydraulic system including the assembly of FIG. 1 operating in an open-circuit configuration, in accordance with an example implementation.

FIG. 8 illustrates a hydraulic system 300 including the assembly 100 operating in an open-circuit configuration, in accordance with an example implementation. In FIG. 8, hydraulic fluid lines are depicted as solid lines, whereas command and sensor signals are depicted in dashed lines. A power source such a battery or an electric generator is configured to provide direct current power to the assembly 100. The power source is not shown to reduce visual clutter in the drawing.

The hydraulic system 300 also includes a fluid reservoir 302 of fluid that can store fluid at a low pressure (e.g., 0-70 psi). The inlet port 118 of the assembly 100 is fluidly-coupled to the fluid reservoir 302. The assembly 100 thus receives fluid from the fluid reservoir 302 through the inlet port 118, then discharges fluid through the outlet port 120 as described above.

The hydraulic system 300 also includes a manifold or valve assembly 304. The valve assembly 304 includes fluid passages and a plurality of solenoid-actuated valves (e.g., one or more directional control valves, flow control valves, load-holding valves, etc.). The solenoid-actuated valves control fluid flow through such fluid passages.

In an example, the valve assembly 304 is coupled to the assembly 100. For instance, the valve assembly 304 can be mounted to the pump port block 117. The valve assembly 304 can thus control fluid flow to and from the inlet port 118 and the outlet port 120.

The controller board 200 can include electronic valve drivers that control electric current and voltage signals provided to solenoid coils of the solenoid-actuated valves of the valve assembly 304 to control actuation and state of operation of the solenoid valves. This way, the electronic drive device 106 can be configured to control state of operation of the solenoid-actuated valves and fluid flow through the valve assembly 304.

The valve assembly 304 is configured to direct fluid flow to and from an actuator 306. The actuator 306 includes a cylinder 308 and a piston 310 slidably accommodated in the cylinder 308. The piston 310 includes a piston head 312 and a rod 314 extending from the piston head 312 along a central longitudinal axis direction of the cylinder 308. The piston head 312 divides the inside space of the cylinder 308 into a first chamber 316 and a second chamber 318.

The electronic drive device 106 can receive input or input information comprising sensor information via signals from various sensors or input devices in the hydraulic system 300, and in response provide electrical signals to various components of the hydraulic system 300. For example, the electronic drive device 106 can receive actuator sensor information from a position sensor and/or a velocity sensor coupled to the piston 310 information indicative of the position x and velocity ẋ of the piston 310. Additionally or alternatively, the electronic drive device 106 can receive from a pressure sensor 320 coupled to the first chamber 316 and/or a pressure sensor 322 coupled to the second chamber 318 information indicative of pressure level p of fluid in the chambers 316, 318 or indicative of a magnitude of a load applied to piston 310.

As mentioned above, the electronic drive device 106 can also receive sensor information from sensors of the assembly 100 (e.g., the encoder 206) indicative of speed of the motor rotor 114, pressure level of fluid discharged from the hydraulic pump 104, etc. The electronic drive device 106 can also receive an input (e.g., from a joystick of a machine) indicative of a commanded or desired speed for the piston 310. The electronic drive device 106 can then provide signals to the electric motor 102 of the assembly 100 and the valve assembly 304 to move the piston 310 at a desired commanded speed in a controlled manner.

For example, to extend the piston 310 (i.e., move the piston 310 up in FIG. 8), the electronic drive device 106 actuates the electric motor 102, which causes the hydraulic pump 104 to draw fluid from the fluid reservoir 302 through the inlet port 118, then provide fluid through the outlet port 120 to the valve assembly 304. The electronic drive device 106 also sends command signals to one or more valves to operate the valve assembly 304 in a first state. As a result, pressurized fluid provided from the assembly 100 via the outlet port 120 flows through the valve assembly 304 to the first chamber 316. As the piston 310 extends, fluid forced out of the second chamber 318 flows to the valve assembly 304, which directs the fluid to the fluid reservoir 302. The electronic drive device 106 operates the electric motor 102 at a particular speed and torque to provide a particular amount of flow to the actuator 306 at a particular pressure to move the piston 310 at a desired speed, while controlling pressure level in the first chamber 316 and/or the second chamber 318.

To retract the piston 310, the electronic drive device 106 can send command signals to one or more valves to operate the valve assembly 304 in a second state in which the valve assembly 304 directs fluid received from the outlet port 120 to the second chamber 318. As the piston 310 retracts, fluid in the first chamber 316 is forced out of the first chamber 316 to the valve assembly 304, which directs the fluid to the fluid reservoir 302.

In operation, the assembly 100, can be used where the electric motor 102 drives the hydraulic pump 104, or where the hydraulic pump 104, drives the electric motor 102 as a generator. As such, the hydraulic pump 104 can be configured as a hydraulic pump/motor capable of operating as a four-quadrant bi-directional pump capable of energy recovery as well as providing fluid power to a hydraulic actuator.

The hydraulic system 300 can be referred to as an open-circuit or open loop system where the assembly 100 draws fluid from the fluid reservoir 302 and then provides fluid to the actuator 306 via the valve assembly 304, and fluid discharged from the actuator 306 returns to the fluid reservoir 302 via the valve assembly 304. Alternatively, the assembly 100 can be used in a closed-circuit configuration where fluid is circulated in a loop between the hydraulic pump 104 and the actuator 306.

Figure 9:
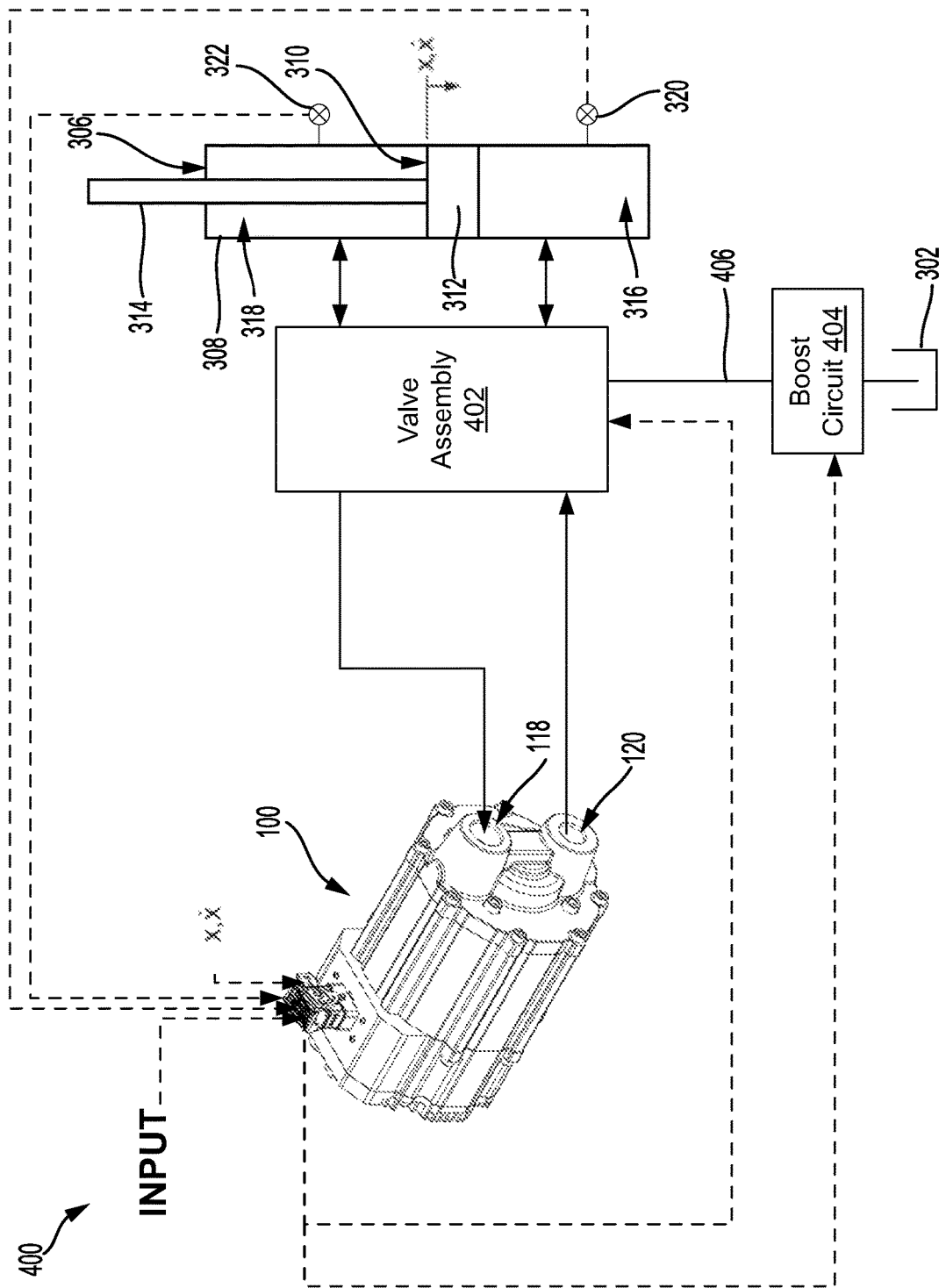
FIG. 9 illustrates a hydraulic system having the assembly of FIG. 1 operating in a closed-circuit configuration, in accordance with an example implementation.

FIG. 9 illustrates a hydraulic system 400 having the assembly 100 operating in a closed-circuit configuration, in accordance with an example implementation. Components of the hydraulic system 400 that are similar to components of the hydraulic system 300 are designated with the same reference numbers.

In the hydraulic system 400, the hydraulic pump 104 of the assembly 100 provides fluid from the outlet port 120 through a valve assembly 402 to the first chamber 316 or the second chamber 318, and fluid being discharged from the other chamber of the actuator 306 returns to the inlet port 118 of the assembly 100. As such, fluid circulates between the hydraulic pump 104 of the assembly 100 and the actuator 306.

Due to the configuration of the piston 310 with the rod 314 extending through the second chamber 318, fluid flow rate of fluid entering into or being discharged from the first chamber 316 is larger than a respective fluid flow rate of fluid entering into or being discharged from the second chamber 318. The hydraulic system 400 includes a boost circuit 404 configured to boost the fluid flow rate, or consume any excess flow, due to a difference in fluid flow rate of fluid provided to or discharged from the first chamber and fluid flow rate of fluid provided to or discharged from the second chamber.

The boost circuit 404 can, for example, include a charge pump that is configured to draw fluid from the fluid reservoir 302 and provide boost fluid flow to a boost flow line 406, which is fluidly-coupled to the valve assembly 402. The valve assembly 402 can include a valve that facilitates joining make-up fluid flow from the boost flow line 406 with fluid discharged from the second chamber 318 before providing the fluid to the inlet port 118 of the assembly 100 to increase the fluid flow rate into the inlet port 118 when the piston 310 is extending.

In another example, the boost circuit 404 can comprise an accumulator configured to store pressurized fluid, and the fluid reservoir 302 might not be used. In another example, the hydraulic system includes multiple actuators and multiple assemblies similar to the assembly 100, and the boost circuit 404 can receive excess flow from other actuators to provide it as boost flow to the actuator 306.

The boost circuit 404 can also be configured to receive excess fluid flowing through the boost flow line 406 and provide a path for such excess fluid to the fluid reservoir 302 (or to other actuators in the system). Particularly, when the piston 310 is retracting and fluid discharged from the first chamber 316 is in excess of fluid consumed required by the second chamber 318, the excess flow is provided through the valve assembly 402 to the boost flow line 406, then to the boost circuit 404, which directs the fluid flow to the fluid reservoir 302 (or to other actuators in the system).

Several configuration variations can be implemented to the example implementation depicted in FIGS. 1-8. For example, rather than having the main housing 108 coupled to the electronic device housing 140, which is configured as a separate housing, both housings can be combined into a single housing. As another example, other types of pumps can be used. Also, in another example implementation, a gearbox might be used to couple the motor rotor 114 to the pump drive shaft 134. Also, while the hydraulic pump 104 is disposed partially within the stator 112, in another example implementation, the pump can be disposed completely within the windings of the stator. In yet another example implementation, rather than using inlet fluid received through the inlet port 118 to cool the main housing 108 (through the cooling fluid channels as described with respect to FIGS. 5 and 6A-6C), fluid from the outlet port 120 can be used as cooling fluid.

Figure 10:
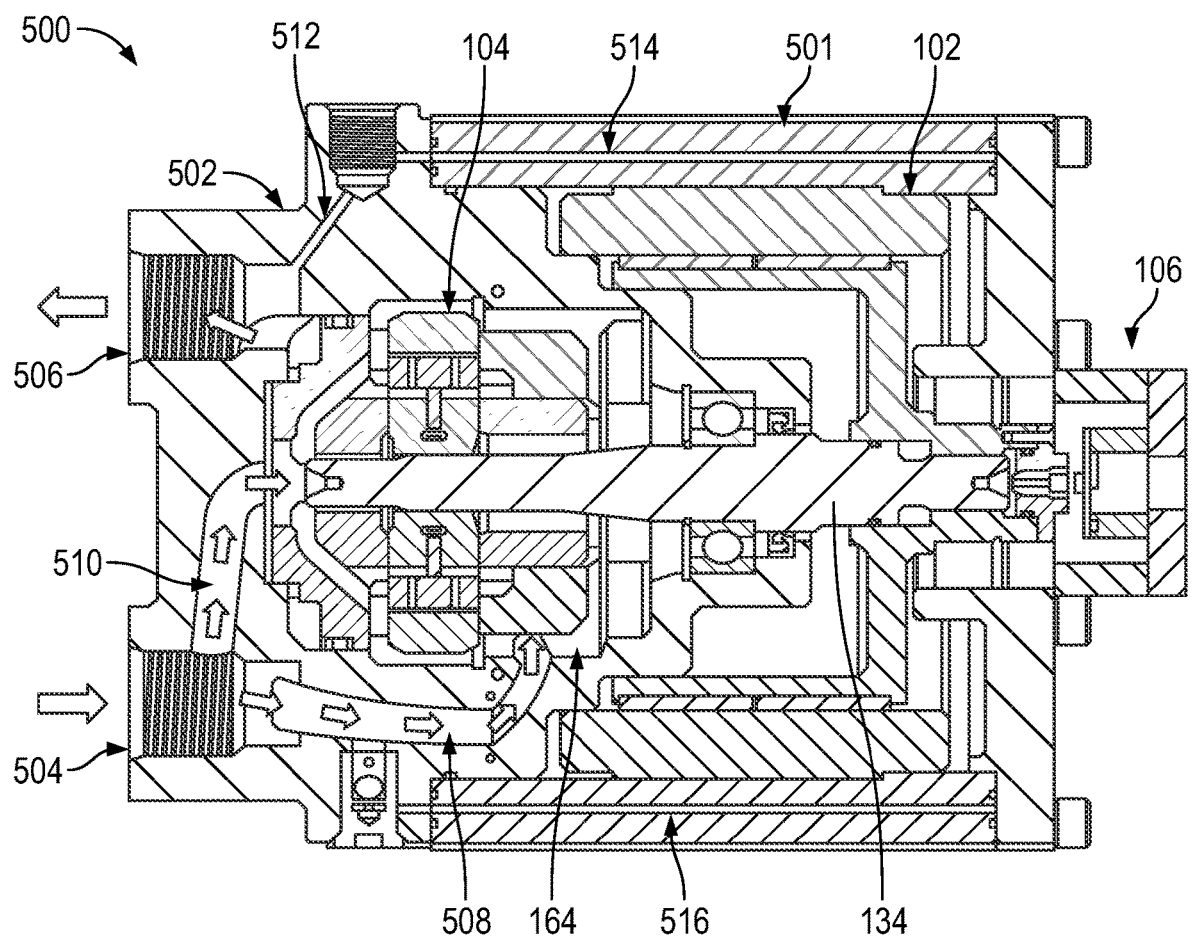
FIG. 10 illustrates a partial cross-sectional side view of an assembly, in accordance with an example implementation.

FIG. 10 illustrates a partial cross-sectional side view of an assembly 500, in accordance with an example implementation. Components of the assembly 500 that are similar to components of the assembly 100 are designated with the same reference numbers. The electronic drive device 106 is shown partially in FIG. 10, but it should be understood that the assembly 500 can be configured with a similar electronic drive device as shown in FIGS. 1-3.

The assembly 500 has a main housing 501. The assembly 500 also has a pump port block 502 having an inlet port 504 and an outlet port 506. Fluid received at the inlet port 504 flows through a first feeding passage 508 and a second feeding passage 510, both providing fluid flow to the pump chamber 164. The hydraulic pump 104 then forces or discharges fluid out of the outlet port 506.

In contrast to the assembly 100 where fluid received at the inlet port 118 is used to cool the main housing 108, in the assembly 500 fluid being provided to the outlet port 506 is used to cool the main housing 501. Particularly, the pump port block 502 has an inlet cooling fluid passage 512 branching from or fluidly-coupled to the outlet port 506. Fluid is then provided to a supply cooling fluid channel 514 in the main housing 501. Cooling fluid then circulates through the main housing 501 and returns through a return cooling fluid channel 516 in the main housing 501, then joins fluid from the inlet port 504 entering the pump chamber 164. As such, fluid being discharged from the hydraulic pump 104 is used to cool the main housing 501 rather than fluid being fed to the hydraulic pump 104.

The detailed description above describes various features and operations of the disclosed systems with reference to the accompanying figures. The illustrative implementations described herein are not meant to be limiting. Certain aspects of the disclosed systems can be arranged and combined in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Further, devices or systems may be used or configured to perform functions presented in the figures. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide The arrangements described herein are for purposes of example only. As such, those skilled in the art will appreciate that other arrangements and other elements (e.g., machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. Also, the terminology used herein is for the purpose of describing particular implementations only, and is not intended to be limiting.

Embodiments of the present disclosure can thus relate to one of the enumerated example embodiments (EEEs) listed below.

EEE 1 is an assembly comprising: a main housing having an internal chamber therein; an electric motor disposed in the internal chamber of the main housing and comprising (i) a stator that is fixedly-positioned in the internal chamber of the main housing, and (ii) a motor rotor positioned within the stator and rotatable relative to the stator; a hydraulic pump positioned in the main housing, at least partially within the motor rotor of the electric motor, wherein the hydraulic pump is configured to receive fluid from an inlet port and provide fluid flow to an outlet port, wherein the hydraulic pump comprises a pump drive shaft that is rotatably-coupled to the motor rotor of the electric motor; and a plurality of cooling fluid channels formed in the main housing and configured to allow fluid to circulate through the main housing to cool the main housing.

EEE 2 is the assembly of EEE 1, further comprising: a pump port block coupled to the main housing and comprising the inlet port and the outlet port; and an inlet cooling fluid passage formed in the pump port block and fluidly-coupled to the inlet port, wherein the plurality of cooling fluid channels comprise: (i) a supply cooling fluid channel that is fluidly-coupled to the inlet cooling fluid passage and configured to allow fluid from the inlet port to flow through the main housing, and (ii) a return cooling fluid channel configured to receive fluid after circulating through the main housing.

EEE 3 is the assembly of any of EEEs 1-2, further comprising: a pump port block coupled to the main housing and comprising the inlet port and the outlet port; and an inlet cooling fluid passage formed in the pump port block and fluidly-coupled to the outlet port, wherein the plurality of cooling fluid channels comprise: (i) a supply cooling fluid channel that is fluidly-coupled to the inlet cooling fluid passage and configured to allow fluid from the outlet port to flow through the main housing, and (ii) a return cooling fluid channel configured to receive fluid after circulating through the main housing.

EEE 4 is the assembly of any of EEEs 1-3, wherein the main housing comprises: a front end face and a back end face, wherein the plurality of cooling fluid channels traverse the main housing between the front end face and the back end face; and a plurality of arcuate grooves disposed along the front end face and the back end face and configured to fluidly couple cooling fluid channels of the plurality of cooling fluid channels, thereby allowing fluid to circulate back and forth from the front end face to the back end face through the main housing.

EEE 5 is the assembly of any of EEEs 1-4, further comprising: a pump port block coupled to the main housing and comprising the inlet port and the outlet port, wherein the pump port block comprises a first feeding passage and a second feeding passage, wherein both the first feeding passage and the second feeding passage receive fluid from the inlet port and communicate fluid to the hydraulic pump.

EEE 6 is the assembly of any of EEEs 1-5, wherein the hydraulic pump is a vane pump comprising: a pump cover; and a vane cartridge having a pump housing, a pump rotor, vanes mounted to the pump rotor, wherein the pump drive shaft is supported by the pump cover via a bearing.

EEE 7 is the assembly of any of EEEs 1-6, wherein the motor rotor comprises (i) a cylindrical portion in which the hydraulic pump is at least partially disposed, and (ii) a spindle portion, wherein the pump drive shaft is rotatably-coupled to the spindle portion of the motor rotor.

EEE 8 is the assembly of EEE 7, wherein the spindle portion is supported on an exterior surface thereof via a bearing, wherein the pump drive shaft has an increased diameter portion that provides further support for an interior surface of the spindle portion.

EEE 9 is the assembly of any of EEEs 7-8, wherein the pump drive shaft is rotatably-coupled to the spindle portion of the motor rotor via a spline engagement, wherein the assembly comprises a first seal and a second seal, wherein the spline engagement is interposed between the first seal and the second seal, such that a lubricant is sealed at the spline engagement between the first seal and the second seal.

EEE 10 is the assembly of EEE 9, further comprising: a cap disposed at an end of the spindle portion of the motor rotor, wherein the first seal is disposed in a first groove about an exterior surface of the pump drive shaft, and wherein the second seal is disposed in a second groove about a respective exterior surface of the cap.

EEE 11 is the assembly of any of EEEs 1-10, further comprising: an electronic device housing coupled to the main housing; an electronics housing cover coupled to the electronic device housing, such that an enclosure is formed by the electronics housing cover and the electronic device housing; and one or more electronic boards disposed in the enclosure.

EEE 12 is the assembly of EEE 11, wherein the one or more electronic boards comprise: an inverter board having a semiconductor switching matrix mounted thereon, wherein the semiconductor switching matrix comprises a plurality of semiconductor switching devices configured to convert direct current power to three-phase alternating current power to drive the electric motor; and a controller board axially offset from the inverter board and electrically-coupled to the inverter board, wherein the controller board comprises a processor configured to generate switching signal to operate the semiconductor switching matrix.

EEE 13 is the assembly of EEE 12, wherein the controller board further comprises an encoder mounted thereto and configured to interact with a magnet coupled to the motor rotor to provide sensor information to the processor indicative of a rotary position of the motor rotor, wherein polarity of the magnet is aligned with respective magnetic polarity of respective magnets of the electric motor.

EEE 14 is a hydraulic system comprising: an actuator having a first chamber and a second chamber; a valve assembly configured to control fluid flow to and from the first chamber and the second chamber of the actuator; and an assembly comprising: a main housing having an internal chamber therein, an electric motor disposed in the internal chamber of the main housing and comprising (i) a stator that is fixedly-positioned in the internal chamber of the main housing, and (ii) a motor rotor positioned within the stator and rotatable relative to the stator, a hydraulic pump positioned in the main housing, at least partially within the motor rotor of the electric motor, wherein the hydraulic pump is configured to receive fluid from an inlet port and provide fluid flow to an outlet port that is fluidly-coupled to the valve assembly, such that the hydraulic pump is configured to provide fluid flow to the actuator via the valve assembly, wherein the hydraulic pump comprises a pump drive shaft rotatably-coupled to the motor rotor of the electric motor, and a plurality of cooling fluid channels formed in the main housing and configured to allow fluid to circulate through the main housing to cool the main housing.

EEE 15 is the hydraulic system of EEE 14, further comprising: a fluid reservoir, wherein the assembly further comprises a pump port block coupled to the main housing and comprising the inlet port and the outlet port, wherein the inlet port is fluidly-coupled to the fluid reservoir such that the hydraulic pump draws fluid from the fluid reservoir, and wherein the valve assembly is fluidly-coupled to the fluid reservoir to provide fluid discharged from the actuator to the fluid reservoir.

EEE 16 is the hydraulic system of any of EEEs 14-15, wherein the assembly is configured to (i) receive fluid discharged from the actuator through the valve assembly at the inlet port, and (ii) provide fluid via the outlet port through the valve assembly to the actuator.

EEE 17 is the hydraulic system of EEE 16, further comprising: a boost circuit that is fluidly-coupled to the valve assembly, wherein the boost circuit is configured to provide boost fluid flow and receive excess fluid flow due to a difference in fluid flow rate of fluid provided to or discharged from the first chamber and fluid flow rate of fluid provided to or discharged from the second chamber.

EEE 18 is the hydraulic system of any of EEEs 14-17, wherein the assembly further comprises: an electronic device housing coupled to the main housing; an electronics housing cover coupled to the electronic device housing, such that an enclosure is formed by the electronics housing cover and the electronic device housing; and one or more electronic boards disposed in the enclosure and comprising: (i) an inverter board having a semiconductor switching matrix mounted thereon, wherein the semiconductor switching matrix comprises a plurality of semiconductor switching devices configured to convert direct current power to three-phase alternating current power to drive the electric motor, and (ii) a controller board axially offset from the inverter board and electrically-coupled to the inverter board, wherein the controller board comprises a processor configured to generate switching signal to operate the semiconductor switching matrix.

EEE 19 is the hydraulic system of EEE 18, wherein the controller board further comprises an encoder mounted thereto and configured to send sensor information to the processor indicative of a rotary position of the motor rotor.

EEE 20 is the hydraulic system of EEE 19, wherein the actuator incudes a piston, and wherein the processor of the controller board is configured to: receive: (i) the sensor information from the encoder, (ii) actuator sensor information indicating one or more of position of the piston, speed of the piston, and pressure level in the first chamber or the second chamber, and (iii) input information indicating a commanded speed for the piston; and responsively, provide command signals to drive the electric motor and operate the valve assembly to achieve the commanded speed of the piston.

What is claimed is:

1. An assembly comprising:
    a main housing having an internal chamber therein, wherein the main housing comprises a front end face, a back end face, and a plurality of arcuate grooves disposed along the front end face and the back end face;
    an electric motor disposed in the internal chamber of the main housing and comprising (i) a stator that is fixedly-positioned in the internal chamber of the main housing, and (ii) a motor rotor positioned within the stator and rotatable relative to the stator;
    a hydraulic pump positioned in the main housing, at least partially within the motor rotor of the electric motor, wherein the hydraulic pump is configured to receive a first portion of fluid from an inlet port and provide fluid flow to an outlet port, wherein the hydraulic pump comprises a pump drive shaft that is rotatably-coupled to the motor rotor of the electric motor; and
    a plurality of cooling fluid channels formed in the main housing, wherein the plurality of cooling fluid channels traverse the main housing between the front end face and the back end face, wherein the plurality of arcuate grooves are configured to fluidly couple cooling fluid channels of the plurality of cooling fluid channels, thereby allowing a second portion of fluid received at the inlet port to circulate back and forth from the front end face to the back end face through the main housing to allow the second portion of fluid to cool the main housing before passing through the hydraulic pump.

2. The assembly of claim 1, further comprising:
    a pump port block coupled to the main housing and comprising the inlet port and the outlet port; and
    an inlet cooling fluid passage formed in the pump port block and fluidly-coupled to the inlet port, wherein the plurality of cooling fluid channels comprise: (i) a supply cooling fluid channel that is fluidly-coupled to the inlet cooling fluid passage and configured to allow fluid from the inlet port to flow through the main housing, and (ii) a return cooling fluid channel configured to receive fluid after circulating through the main housing.

3. The assembly of claim 1, further comprising:
a pump port block coupled to the main housing and comprising the inlet port and the outlet port; and
an inlet cooling fluid passage formed in the pump port block and fluidly-coupled to the outlet port, wherein the plurality of cooling fluid channels comprise: (i) a supply cooling fluid channel that is fluidly-coupled to the inlet cooling fluid passage and configured to allow fluid from the outlet port to flow through the main housing, and (ii) a return cooling fluid channel configured to receive fluid after circulating through the main housing.

4. The assembly of claim 1, further comprising:
a pump port block coupled to the main housing and comprising the inlet port and the outlet port, wherein the pump port block comprises a first feeding passage and a second feeding passage, wherein both the first feeding passage and the second feeding passage receive fluid from the inlet port and communicate fluid to the hydraulic pump.

5. The assembly of claim 1, wherein the hydraulic pump is a vane pump comprising:
a pump cover; and
a vane cartridge having a pump housing, a pump rotor, vanes mounted to the pump rotor, wherein the pump drive shaft is supported by the pump cover via a bearing.

6. An assembly comprising:
a main housing having an internal chamber therein;
an electric motor disposed in the internal chamber of the main housing and comprising a stator that is fixedly-positioned in the internal chamber of the main housing, and a motor rotor positioned within the stator and rotatable relative to the stator, wherein the motor rotor comprises (i) a cylindrical portion in which the hydraulic pump is at least partially disposed, and (ii) a spindle portion, wherein the spindle portion is supported on an exterior surface thereof via a bearing;
a hydraulic pump positioned in the main housing, at least partially within the motor rotor of the electric motor, wherein the hydraulic pump is configured to receive fluid from an inlet port and provide fluid flow to an outlet port, wherein the hydraulic pump comprises a pump drive shaft that is rotatably-coupled to the spindle portion of the motor rotor of the electric motor, wherein the pump drive shaft has an increased diameter portion that provides further support for an interior surface of the spindle portion; and
a plurality of cooling fluid channels formed in the main housing and configured to allow fluid to circulate through the main housing to cool the main housing.

7. The assembly of claim 6, wherein the pump drive shaft is rotatably-coupled to the spindle portion of the motor rotor via a spline engagement, wherein the assembly comprises a first seal and a second seal, wherein the spline engagement is interposed between the first seal and the second seal, such that a lubricant is sealed at the spline engagement between the first seal and the second seal.

8. The assembly of claim 7, further comprising:
a cap disposed at an end of the spindle portion of the motor rotor, wherein the first seal is disposed in a first groove about an exterior surface of the pump drive shaft, and wherein the second seal is disposed in a second groove about a respective exterior surface of the cap.

9. The assembly of claim 1, further comprising:
an electronic device housing coupled to the main housing;
an electronics housing cover coupled to the electronic device housing, such that an enclosure is formed by the electronics housing cover and the electronic device housing; and
one or more electronic boards disposed in the enclosure.

10. The assembly of claim 9, wherein the one or more electronic boards comprise:
an inverter board having a semiconductor switching matrix mounted thereon, wherein the semiconductor switching matrix comprises a plurality of semiconductor switching devices configured to convert direct current power to three-phase alternating current power to drive the electric motor; and
a controller board axially offset from the inverter board and electrically-coupled to the inverter board, wherein the controller board comprises a processor configured to generate switching signal to operate the semiconductor switching matrix.

11. The assembly of claim 10, wherein the electric motor further comprises a plurality of magnets mounted to the motor rotor in an annular space between the stator and the motor rotor, wherein the plurality of magnets are configured to interact with a magnetic field generated by the stator rotate the motor rotor, wherein the plurality of magnets have a magnetic polarity, wherein the controller board further comprises an encoder mounted thereto and configured to interact with a magnet coupled to the motor rotor to provide sensor information to the processor indicative of a rotary position of the motor rotor, wherein a respective magnetic polarity of the magnet is aligned with the magnetic polarity of the plurality of magnets of the electric motor.

12. A hydraulic system comprising:
an actuator having a first chamber and a second chamber;
a valve assembly configured to control fluid flow to and from the first chamber and the second chamber of the actuator; and
an assembly comprising:
a main housing having an internal chamber therein, wherein the main housing comprises a front end face, a back end face, and a plurality of arcuate grooves disposed along the front end face and the back end face,
an electric motor disposed in the internal chamber of the main housing and comprising (i) a stator that is fixedly-positioned in the internal chamber of the main housing, and (ii) a motor rotor positioned within the stator and rotatable relative to the stator,
a hydraulic pump positioned in the main housing, at least partially within the motor rotor of the electric motor, wherein the hydraulic pump is configured to receive a first portion of fluid from an inlet port and provide fluid flow to an outlet port that is fluidly-coupled to the valve assembly, such that the hydraulic pump is configured to provide fluid flow to the actuator via the valve assembly, wherein the hydraulic pump comprises a pump drive shaft rotatably-coupled to the motor rotor of the electric motor, and
a plurality of cooling fluid channels formed in the main housing, wherein the plurality of cooling fluid channels traverse the main housing between the front end face and the back end face, wherein the plurality of arcuate grooves, are configured to fluidly couple cooling fluid channels of the plurality of cooling fluid channels, thereby allowing a second portion of fluid received at the inlet port to circulate back and forth from the front end face to the back end face through the main housing to allow the second portion of fluid to cool the main housing before passing through the hydraulic pump.

13. The hydraulic system of claim 12, further comprising:
a fluid reservoir, wherein the assembly further comprises a pump port block coupled to the main housing and comprising the inlet port and the outlet port, wherein the inlet port is fluidly-coupled to the fluid reservoir such that the hydraulic pump draws fluid from the fluid reservoir, and wherein the valve assembly is fluidly-coupled to the fluid reservoir to provide fluid discharged from the actuator to the fluid reservoir.

14. The hydraulic system of claim 12, wherein the assembly is configured to (i) receive fluid discharged from the actuator through the valve assembly at the inlet port, and (ii) provide fluid via the outlet port through the valve assembly to the actuator.

15. The hydraulic system of claim 14, further comprising:
a boost circuit that is fluidly-coupled to the valve assembly, wherein the boost circuit is configured to provide boost fluid flow and receive excess fluid flow due to a difference in fluid flow rate of fluid provided to or discharged from the first chamber and fluid flow rate of fluid provided to or discharged from the second chamber.

16. The hydraulic system of claim 12, wherein the assembly further comprises:
an electronic device housing coupled to the main housing;
an electronics housing cover coupled to the electronic device housing, such that an enclosure is formed by the electronics housing cover and the electronic device housing; and
one or more electronic boards disposed in the enclosure and comprising: (i) an inverter board having a semiconductor switching matrix mounted thereon, wherein the semiconductor switching matrix comprises a plurality of semiconductor switching devices configured to convert direct current power to three-phase alternating current power to drive the electric motor, and (ii) a controller board axially offset from the inverter board and electrically-coupled to the inverter board, wherein the controller board comprises a processor configured to generate switching signal to operate the semiconductor switching matrix.

17. The hydraulic system of claim 16, wherein the controller board further comprises an encoder mounted thereto and configured to send sensor information to the processor indicative of a rotary position of the motor rotor.

18. The hydraulic system of claim 17, wherein the actuator incudes a piston, and wherein the processor of the controller board is configured to:
receive: (i) the sensor information from the encoder, (ii) actuator sensor information indicating one or more of position of the piston, speed of the piston, and pressure level in the first chamber or the second chamber, and (iii) input information indicating a commanded speed for the piston; and
responsively, provide command signals to drive the electric motor and operate the valve assembly to achieve the commanded speed of the piston.

19. The assembly of claim 1, wherein the second portion of fluid cools the main housing before joining the first portion of fluid and entering the hydraulic pump.

20. The hydraulic system of claim 12, wherein the second portion of fluid cools the main housing of the assembly before joining the first portion of fluid and entering the hydraulic pump.

* * * * *